(12) United States Patent
Chiang et al.

(10) Patent No.: US 8,055,069 B2
(45) Date of Patent: Nov. 8, 2011

(54) IMAGE DATA SAMPLING METHOD

(75) Inventors: Chin-Yi Chiang, Taipei (TW); Wallace Huang, Taipei (TW); Giga Hsu, Taipei (TW)

(73) Assignee: Via Technologies, Inc., Shindian, Taipei (TW)

( * ) Notice: Subject to any disclaimer, the term of this patent is extended or adjusted under 35 U.S.C. 154(b) by 1225 days.

(21) Appl. No.: 11/345,352

(22) Filed: Feb. 1, 2006

(65) Prior Publication Data
US 2006/0188149 A1    Aug. 24, 2006

(30) Foreign Application Priority Data
Feb. 5, 2005  (TW) ................. 94104081 A

(51) Int. Cl.
*G06K 9/36*  (2006.01)
*G06K 9/46*  (2006.01)
(52) U.S. Cl. ..................... 382/166; 382/232
(58) Field of Classification Search ................. 382/166, 382/284, 233, 296, 164, 168, 171, 172, 173, 382/176, 180, 232, 235, 239, 244, 245, 248, 382/249; 358/450, 453, 464, 539, 426, 433, 358/261.01; 348/397, 441, 450, 253; 375/240.03, 375/240.21, 240.26, 240.25
See application file for complete search history.

(56) References Cited

U.S. PATENT DOCUMENTS

| | | | | |
|---|---|---|---|---|
| 5,754,231 A * | 5/1998 | Odaka et al. | ............. | 375/240.01 |
| 6,078,690 A * | 6/2000 | Yamada et al. | ............. | 382/233 |
| 6,427,025 B1 * | 7/2002 | Shimomura et al. | ......... | 382/232 |
| 6,608,935 B2 * | 8/2003 | Nagumo et al. | ............. | 382/233 |
| 6,757,429 B2 | 6/2004 | Hu | | |
| 6,766,104 B2 * | 7/2004 | Hori et al. | ............. | 386/356 |
| 6,795,581 B1 * | 9/2004 | Nomura | ............. | 382/232 |
| 6,823,082 B2 * | 11/2004 | Hu | ............. | 382/166 |
| 6,961,063 B1 * | 11/2005 | Kuriakin et al. | ............. | 345/506 |
| 6,989,837 B2 * | 1/2006 | Gu et al. | ............. | 345/558 |
| 6,996,281 B2 * | 2/2006 | Boliek et al. | ............. | 382/236 |
| 7,016,410 B2 * | 3/2006 | Chang et al. | ............. | 375/240.03 |
| 7,421,130 B2 * | 9/2008 | Jeffrey et al. | ............. | 382/232 |
| 7,460,718 B2 * | 12/2008 | Gautier et al. | ............. | 382/232 |

OTHER PUBLICATIONS

Xiaolin Wu, "Lossless compression of continuous-tone images via context selection, quantization, and modeling," Image Processing, IEEE Transactions on , vol. 6, No. 5, pp. 656-664, May 1997.*
Yu-Chee Tseng; Yu-Yuan Chen; Hsiang-Kuang Pan, "A secure data hiding scheme for binary images," Communications, IEEE Transactions on , vol. 50, No. 8, pp. 1227-1231, Aug. 2002.*

* cited by examiner

*Primary Examiner* — Gregory M Desire
*Assistant Examiner* — Andrae S Allison
(74) *Attorney, Agent, or Firm* — Kirton & McConkie; Evan R. Witt

(57) ABSTRACT

In a method for sampling image data from an image frame with component video, the image frame includes a first component frame, a second component frame and a third component frame. The method comprises steps of selecting a first component portion, a second component portion and a third component portion from the first component frame, the second component frame and the third component frame, respectively; and operating the first component portion, the second component portion and the third component portion to obtain a sampled unit arranged as a block array. The sampled unit includes at least a first component blocks derived from the first component portion, a second component block derived from the second component portion and a third component block derived from the third component portion.

17 Claims, 8 Drawing Sheets

IMAGE DATA SAMPLING METHOD

FIELD OF THE INVENTION

The present invention relates to an image data sampling method, and more particularly to an image data sampling method for image compression.

BACKGROUND OF THE INVENTION

With highly development and improvement of image-processing techniques, various electronic apparatuses including web camera, digital camera, cellular and picture phone, personal digital assistant (PDA), multimedia computer, etc., take advantages of these techniques to get well developed and enhanced. In order to facilitate rapid transmission of the digital images, the images are usually compressed, for example, in JPEG or MPEG compression operation before the image transmission. Full color images, perhaps presented in RGB format, however, cannot be compressed in JPEG or MPEG compression operation unless they are converted into images presented in a compressible format, for example, YCbCr (digital YUV) format.

Please refer to FIG. 1 which is a schematic diagram illustrating RGB to YCbCr conversion of an image frame. A full color image frame consists of m columns and n rows of pixels is practically stored as three sub-frames including a red frame IR, a green frame IG and a blue frame IB, each of which consists of m columns and n rows of pixel values. After color space transformation T, a luminance frame Y, a blue-chrominance frame Cb and a red-chrominance frame Cr, each of which consists of m columns and n rows of luminance values or chrominance values, are generated. The following equations are applicable to the color space transformation to get the Y, Cb and Cr values:

$$Y(i)=0.299R(i)+0.587G(i)+0.114B(i)$$

$$Cb(i)=-0.168R(i)-0.331G(i)+0.499B(i)$$

$$Cr(i)=0.500R(i)-0.419G(i)-0.081B(i)$$

where i is the serial number of the pixel of interest.

Afterwards, the image frame presented by the luminance frame Y, the blue-chrominance frame Cb and the red-chrominance frame Cr is ready to be compressed. The image frame is sampled portion by portion as illustrated in FIG. 1, and the basic processing unit 11, 12, 13, for example, is 8×8 pixels or 16×16 pixels. For executing JPEG compression, the image portions are sampled, discrete cosine transformed (DCT), quantized, and entropy coded in sequence.

Giving a basic processing unit consisting of 16 columns and 16 rows of pixels as an example, the image portions 11, 12 and 13 all have 16 columns and 16 rows of pixel values. The Y-component portion 11 consists of four 8×8 blocks $Y_1$, $Y_2$, $Y_3$ and $Y_4$ arranged as a 2×2 array. The same arrangement is applied to the Cb-component portion 12 and the Cr-component portion 13 to provide eight 8×8 blocks $Cb_1$, $Cb_2$, $Cb_3$, $Cb_4$, $Cr_1$, $Cr_2$, $Cr_3$ and $Cr_4$.

The image portions are then compressed according to one of the sub-sampling algorithms conventionally used for JPEG compression, for example 4:4:4, 4:2:2, 4:2:0, 4:1:1 or 2:1:1 sub-sampling algorithms. Through the sub-sampling operation, a minimum coded unit (MCU) for compression will be obtained.

FIG. 2(a) illustrates the 4:1:1 sub-sampling algorithm. The Y-component portion 11, the Cb-component portion 12 and the Cr-component portion 13 are processed by operators S11, S12 and S13 to result in the minimum coded unit M11 consisting of unit portions 111, 112 and 113, respectively. The Y-component unit portion 111 is identical to the Y-component portion 11 consisting of four 8×8 blocks $Y_1$, $Y_2$, $Y_3$ and $Y_4$. The Cb-component portion 12 is converted into the Cb-component unit portion 112 consisting of an 8×8 block Cb' by averaging the pixel values of four blocks $Cb_1$, $Cb_2$, $Cb_3$ and $Cb_4$ as the pixel values of the block Cb'. Similarly, the new Cr-component unit portion 113 consisting of an 8×8 block Cr' is obtained by averaging the four blocks $Cr_1$, $Cr_2$, $Cr_3$ and $Cr_4$ of the Cr-component portion 13. Alternatively, the blocks Cb' and Cr' can be a selected one or respective portions, e.g. $Cb_1$ and $Cr_1$. The six blocks $Y_1$, $Y_2$, $Y_3$, $Y_4$, Cb' and Cr' map to four pixel arrays [$Y_1$, Cb', Cr'], [$Y_2$, Cb', Cr'], [$Y_3$, Cb', Cr'] and [$Y_4$, Cb', Cr'].

FIG. 2(b) illustrates the 2:1:1 sub-sampling algorithm wherein the resulting minimum coded unit (MCU) consists of 2-block Y-component portion, 1-block Cb-component portion and 1-block Cr-component portion. The Y-component portion 11, the Cb-component portion 12 and the Cr-component portion 13 are processed into unit portions 211a, 212a, 213a, 211b, 212b and 213b by operators S21, S22 and S23. One new Y-component portion 211a consists of blocks $Y_1$ and $Y_2$, and the other new Y-component portion 211b consists of $Y_3$ and $Y_4$. The two blocks $Cb_1'$ and $Cb_2'$ of the new Cb-component portions 212a and 212b are obtained by averaging the two blocks $Cb_1$ and $Cb_2$ and the two blocks $Cb_3$ and $Cb_4$, respectively. Similarly, the two blocks $Cr_1'$ and $Cr_2'$ of the new Cr-component portions 213a and 213b are obtained by averaging the two blocks $Cr_1$ and $Cr_2$ and the two blocks $Cr_3$ and $Cr_4$, respectively. The resulting four Y-component blocks, two Cb-component blocks and two Cr-component blocks are divided into two minimum coded unit (MCU) M21 consisting of blocks $Y_1$, $Y_2$, $Cb_1'$ and $Cr_1'$ and minimum coded unit (MCU) M22 consisting of blocks $Y_3$, $Y_4$, $Cb_2'$ and $Cr_2'$. The eight blocks $Y_1$, $Y_2$, $Y_3$, $Y_4$, $Cb_1'$, $Cb_2'$, $Cr_1'$ and $Cr_2'$ map to four pixel arrays [$Y_1$, $Cb_1'$, $Cr_1'$], [$Y_2$, $Cb_1'$, $Cr_1'$], [$Y_3$, $Cb_2'$, $Cr_2'$] and [$Y_4$, $Cb_2'$, $Cr_2'$].

FIG. 2(c) illustrates the 4:4:4 sub-sampling algorithm wherein all the blocks wherein all the blocks $Y_1$, $Y_2$, $Y_3$, $Y_4$, $Cb_1$, $Cb_2$, $Cb_3$, $Cb_4$, $Cr_1$, $Cr_2$, $Cr_3$ and $Cr_4$ remain to constitute a minimum coded unit (MCU) M31 through the processing of operators S31, S32 and S33 to obtain new unit portions 311, 312 and 313. The 4:4:4 sub-sampling is also called "no chroma sub-sampling" or "lossless sub-sampling". The twelve blocks $Y_1$, $Y_2$, $Y_3$, $Y_4$, $Cb_1$, $Cb_2$, $Cb_3$, $Cb_4$, $Cr_1$, $Cr_2$, $Cr_3$ and $Cr_4$ map to four pixel blocks [$Y_1$, $Cb_1$, $Cr_1$], [$Y_2$, $Cb_2$, $Cr_2$], [$Y_3$, $Cb_3$, $Cr_3$] and [$Y_4$, $Cb_4$, $Cr_4$].

After the sub-sampling operation, the minimum coded unit M11, M21, M22 or M31 is loaded into memory. According to the 4:1:1 sub-sampling algorithm, the minimum coded unit M11 occupies storage space equivalent to six 8×8 blocks. On the other hand, a storage space equivalent to eight 8×8 blocks is required to store the minimum coded units M21 and M22 according to the 2:1:1 sub-sampling algorithm, and a storage space equivalent to twelve 8×8 blocks is required to store the minimum coded unit 31 according to the 4:4:4 sub-sampling algorithm. There is need to reduce the size of the minimum coded unit so as to save the storage space of memory.

SUMMARY OF THE INVENTION

Therefore, the present invention provides a method for sampling image data for compression, which requires less storage space for the minimum coded unit.

The present invention provides a method for sampling image data from an image frame with component video including a first component frame, a second component frame and a third component frame. The method at first selects a first component portion, a second component portion and a third component portion from the first component frame, the second component frame and the third component frame, respectively. Then, the first component portion, the second component portion and the third component portion are operated to obtain a sampled unit arranged as a block array. The sampled unit includes at least a first component blocks derived from the first component portion, a second component block derived from the second component portion and a third component block derived from the third component portion.

The present invention also provides a method for sampling image data from an image frame with component video. The method first selects a first component portion, a second component portion and a third component portion from the first component frame, the second component frame and the third component frame, respectively. Then, the first component portion, the second component portion and the third component portion are operated to result in a first component intermediate portion derived from the first component portion, a second component intermediate portion derived from the second component portion and a third component intermediate portion derived from the third component portion. At last, the first component intermediate portion, the second component intermediate portion and the third component intermediate portion are operated to obtain a sampled unit.

The present invention further provides a method for sampling image data from an image frame with component video which includes a Y-component frame, a Cb-component frame and a Cr-component frame. The method includes steps of selecting a Y-component portion, a Cb-component portion and a Cr-component portion from the Y-component frame, the Cb-component frame and the Cr-component frame, respectively; operating the Y-component portion, the Cb-component portion and the Cr-component portion according to a sub-sampling algorithm for JPEG or MPEG compression to result in a Y-component intermediate portion, a Cb-component intermediate portion and a Cr-component intermediate portion; and operating the Y-component intermediate portion, the Cb-component intermediate portion and the Cr-component intermediate portion to obtain a minimum coded unit of 2×2 block array for JPEG or MPEG compression. The 2×2 block array includes two Y-component blocks selected from the Y-component intermediate portion, one Cb-component block selected from the Cb-component intermediate portion, and one Cr-component block selected from the Cr-component intermediate portion.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
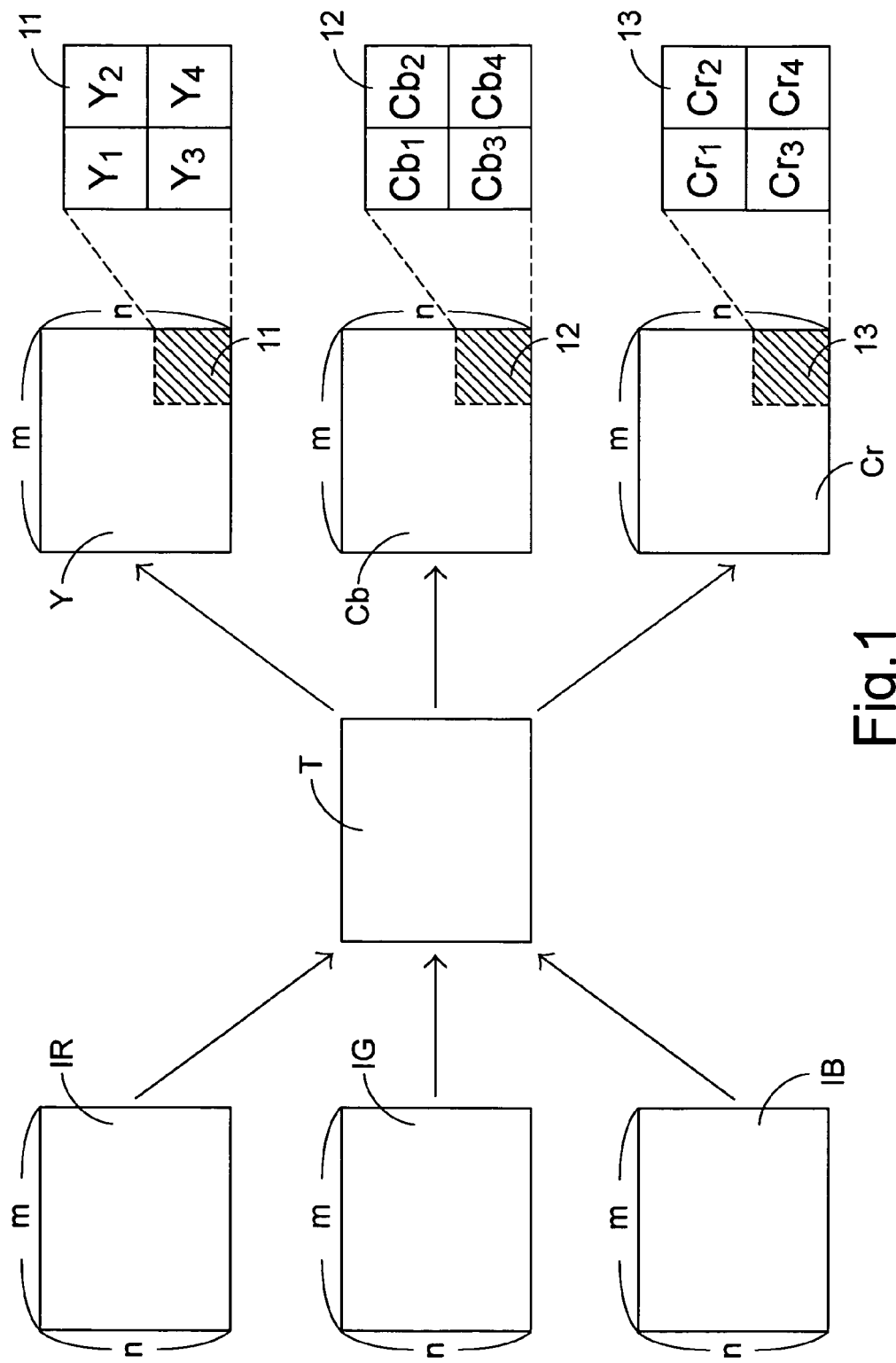
FIG. 1 is a schematic diagram illustrating RGB to YCbCr conversion of an image frame.
Figure 2A:
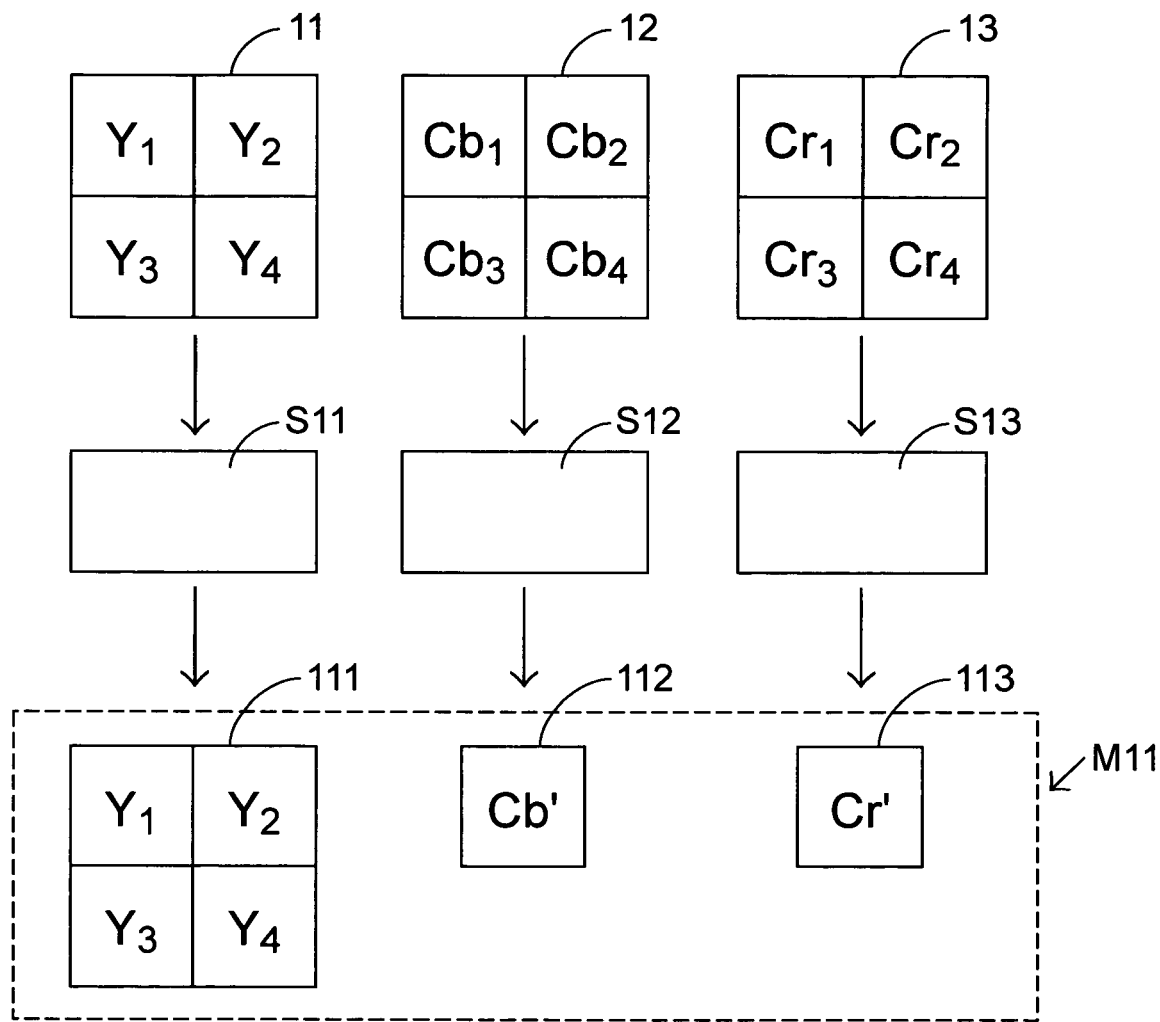
FIGS. 2(a)~(c) are schematic diagrams illustrating conventional 4:1:1, 2:1:1 and 4:4:4 sub-sampling algorithms, respectively.
Figure 3A:
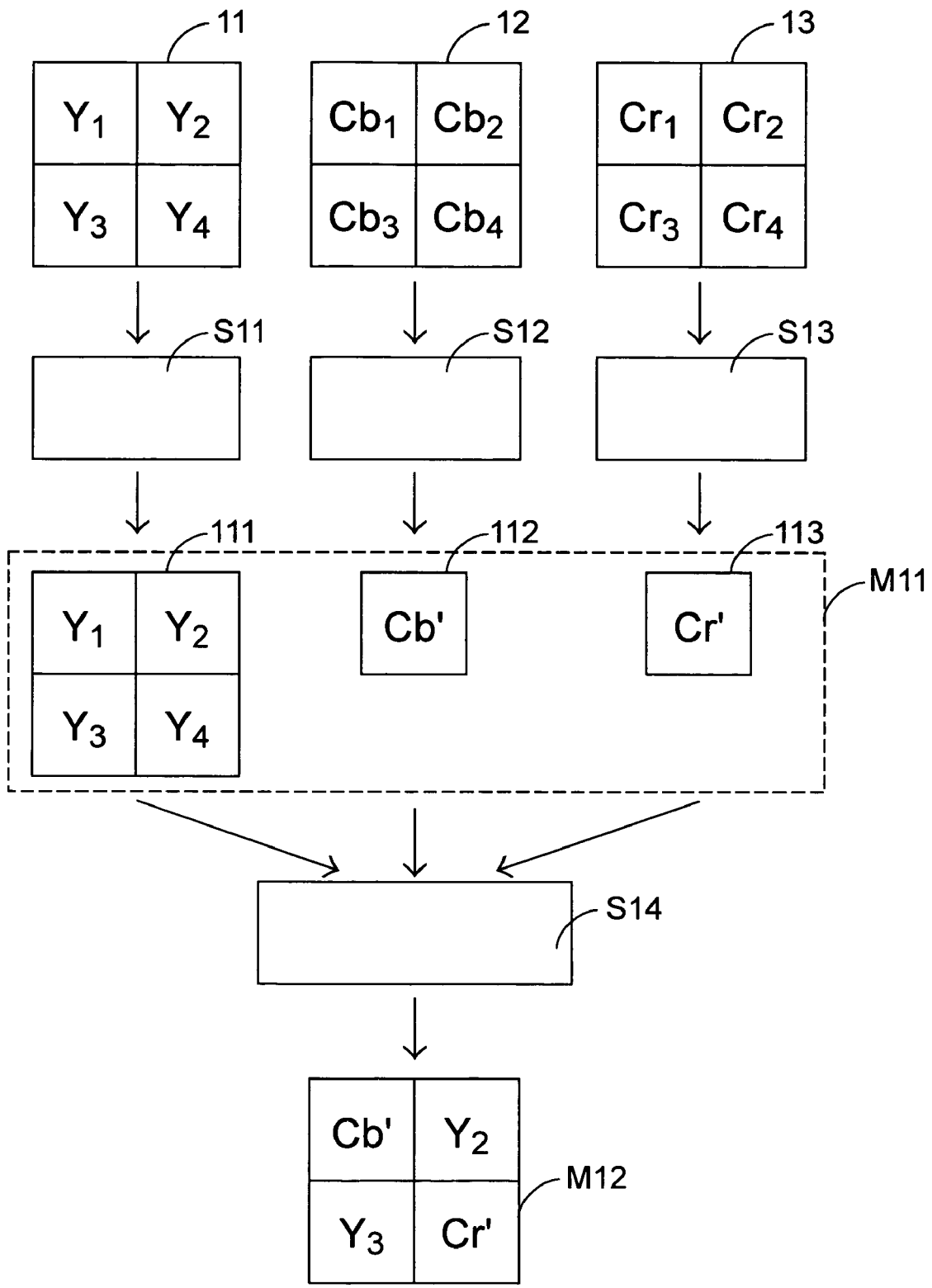
FIGS. 3(a)~(c) are schematic diagrams illustrating an image data sampling method modifying the 4:1:1, 2:1:1 and 4:4:4 sub-sampling algorithms according to embodiments of the present invention, respectively.

The method for sampling image data according to the present invention will be illustrated hereinafter with reference to the sub-sampling algorithms of FIGS. 3(a)~(c). Please refer to FIG. 3(a). According to the conventional 4:1:1 sub-sampling algorithm to a component video or a color difference video described above with reference to FIG. 2(a), the Y-component portion 11, the Cb-component portion 12 and the Cr-component portion 13 are converted into 4-block Y-component intermediate portion 111, 1-block Cb-component intermediate portion 112 and 1-block Cr-component intermediate portion 113, respectively. The intermediate portions 111, 112 and 113 constitute the conventional minimum coded unit M11, which is further processed by the operator S14 to result in a minimum coded unit M12 consisting of four 8×8 blocks. The minimum coded unit M12 consists of four blocks Cb', $Y_2$, $Y_3$ and Cr'. The two luminance blocks $Y_2$ and $Y_3$ are directly selected from the Y-component intermediate portion 111 and arranged diagonally, and the two chrominance blocks Cb' and Cr' are the same as the Cb-component intermediate portion 112 and the Cr-component intermediate portion 113, respectively, and also arranged diagonally. In this embodiment, the minimum coded unit M12 is about 67% in size as compared with the conventional 4:1:1 sub-sampling minimum coded unit M11.

Figure 2B:
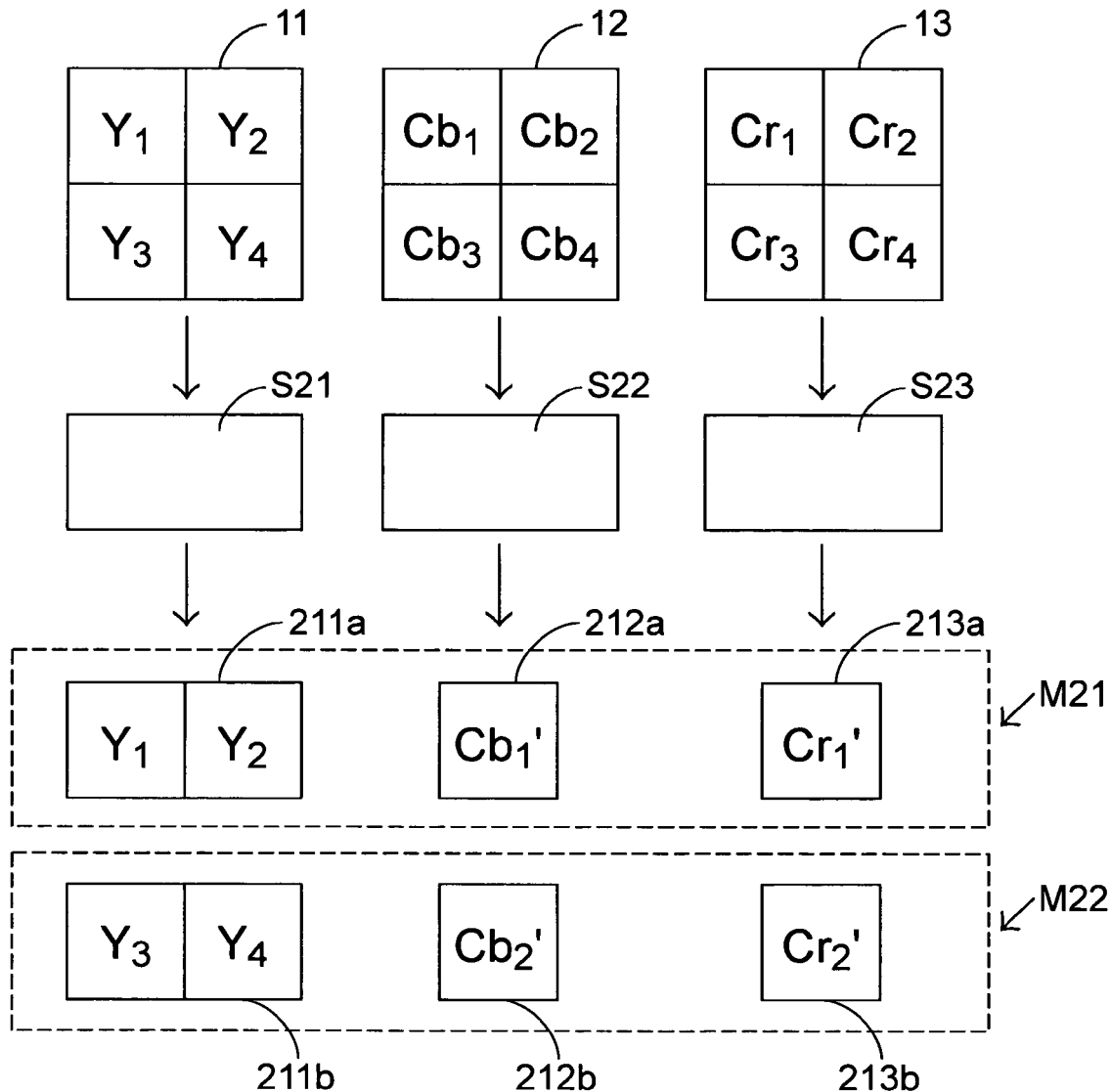
Figure 3B:
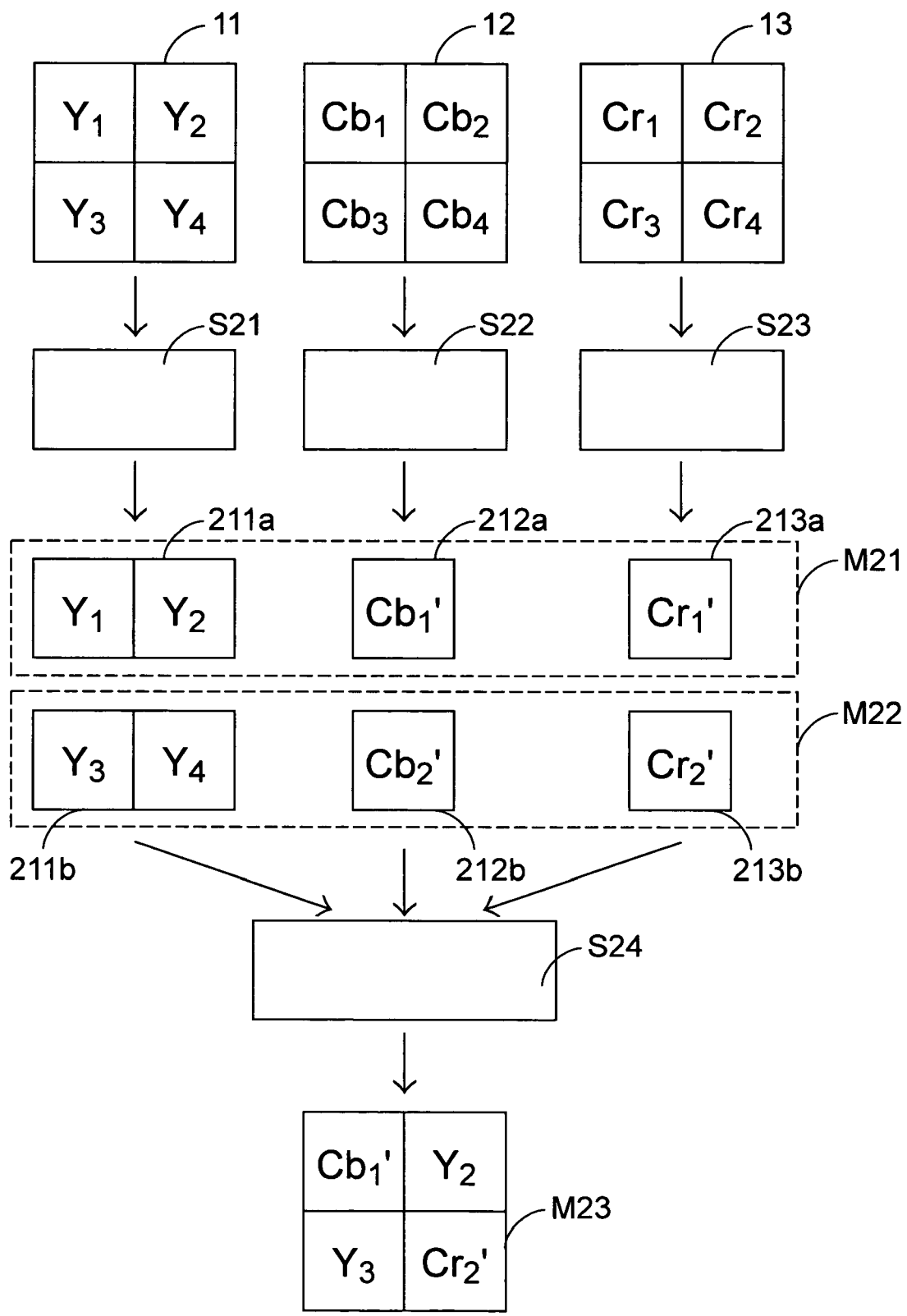

Please refer to FIG. 3(b). According to the conventional 2:1:1 sub-sampling algorithm to a component video described above with reference to FIG. 2(b), the Y-component portion 11, the Cb-component portion 12 and the Cr-component portion 13 are converted into two Y-component intermediate portions 211a and 211b, two Cb-component intermediate portions 212a and 212b, and two Cr-component intermediate portions 213a and 213b, respectively. The intermediate portions 211a, 212a and 213a constitute the conventional minimum coded unit M21, while the intermediate portions 211b, 212b and 213b constitute the conventional minimum coded unit M22. Then, the two conventional minimum coded units M21 and M22 are further processed by the operator S24 to result in a minimum coded unit M23 consisting of four 8×8 blocks. The minimum encoded unit M23 consists of four blocks $Cb_1$', $Y_2$, $Y_3$ and $Cr_2$'. The two luminance blocks $Y_2$ and $Y_3$ are directly selected from the Y-component intermediate portions 211a and 211b and arranged diagonally, and the two chrominance blocks $Cb_1$' and $Cr_2$' are directly selected from the Cb-component intermediate portion 212a and the Cr-component intermediate portion 213b, respectively, and also arranged diagonally. In this embodiment, the minimum coded unit M23 is 50% in size as compared with the conventional 2:1:1 sub-sampling minimum coded units M21 and M22.

Figure 2C:
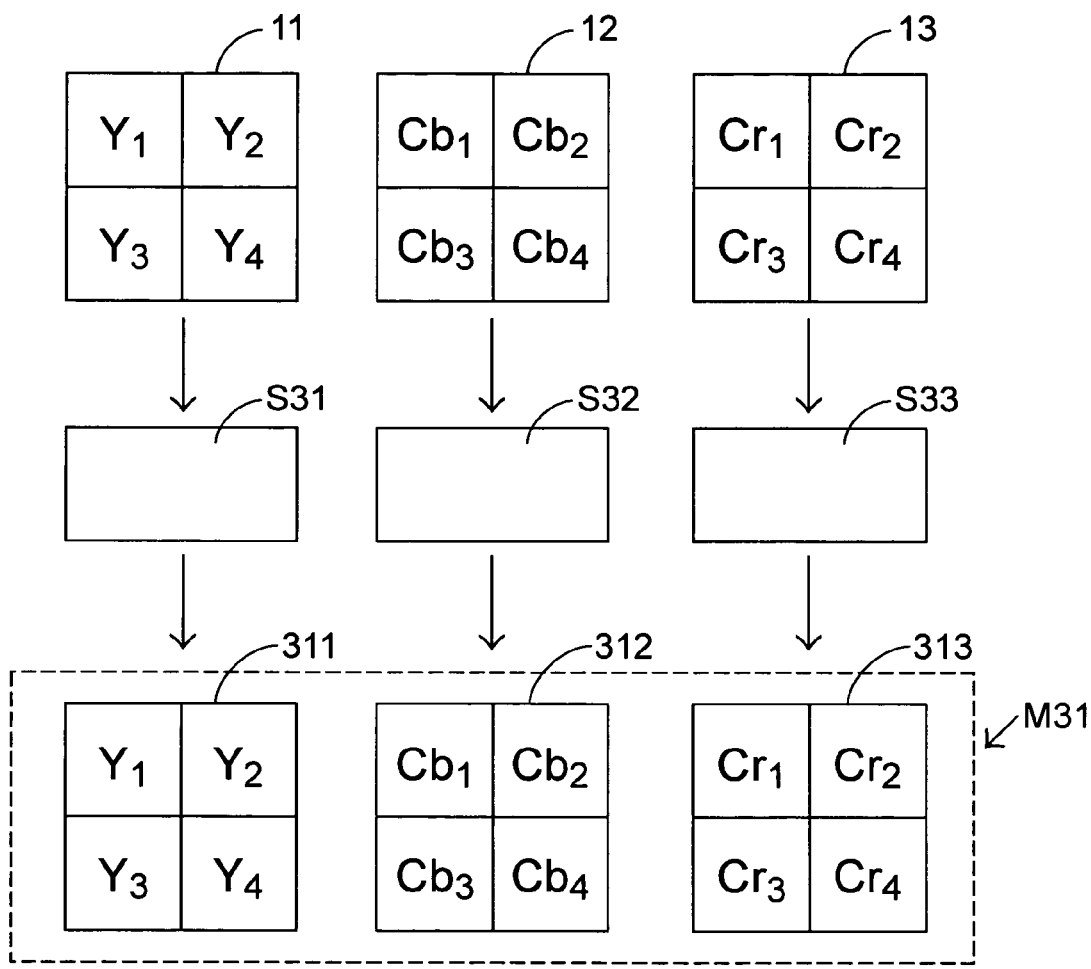
Figure 3C:
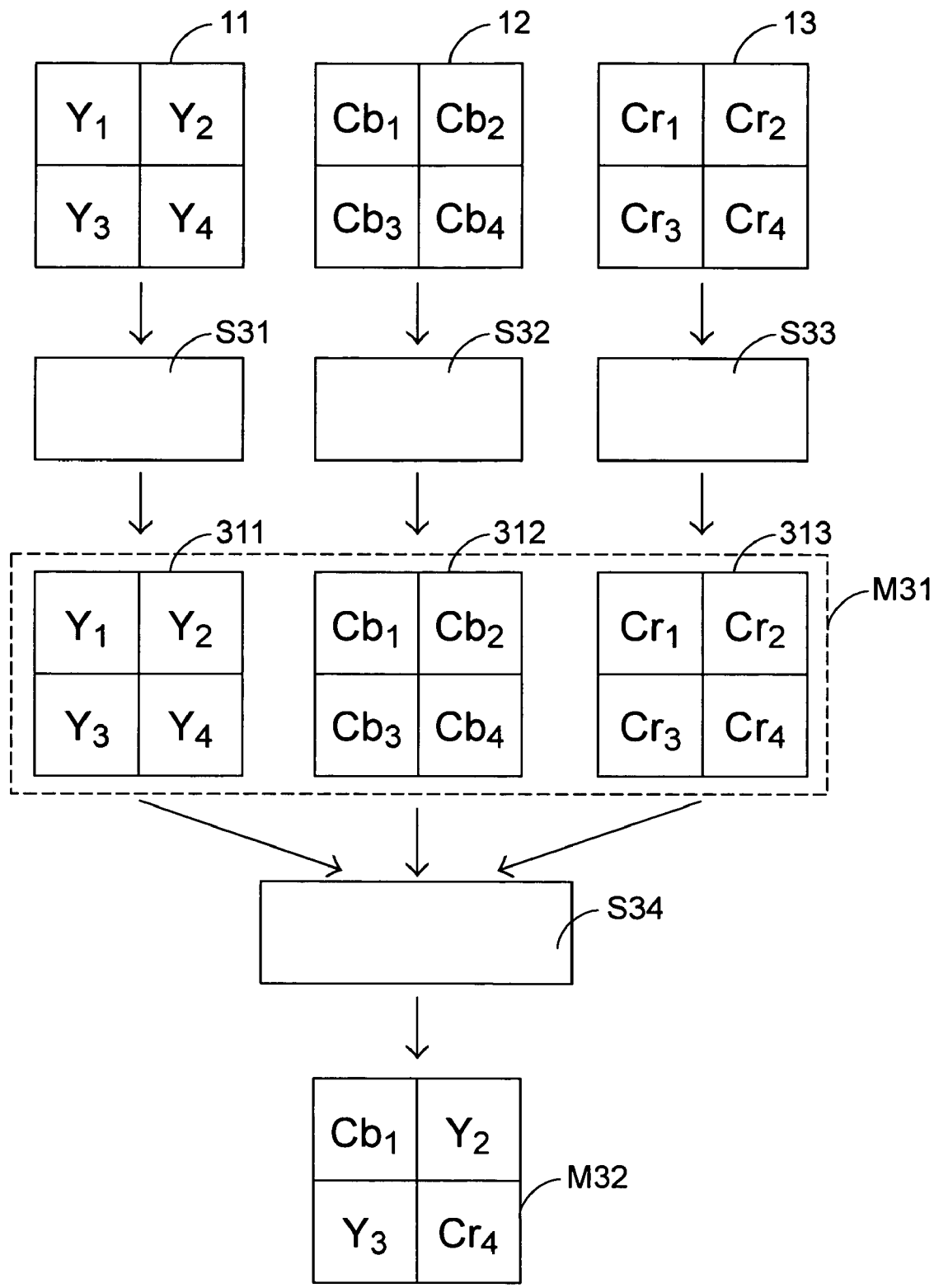

Please refer to FIG. 3(c). According to the conventional 4:4:4 sub-sampling algorithm to a component video described above with reference to FIG. 2(c), the Y-component portion 11, the Cb-component portion 12 and the Cr-component portion 13 are converted into 4-block Y-component intermediate portion 311, 4-block Cb-component intermediate portion 312 and 4-block Cr-component intermediate portion 313, respectively. The intermediate portions 311, 312 and 313 constitute the conventional minimum coded unit M31, which is further processed by the operator S34 to result in a minimum coded unit M32 consisting of four 8×8 blocks. The minimum coded unit M32 consists of four blocks $Cb_1, Y_2, Y_3$ and $Cr_4$. The two luminance blocks $Y_2$ and $Y_3$ are directly selected from the Y-component intermediate portion 311 and arranged diagonally, and the two chrominance blocks $Cb_1$ and $Cr_4$ are directly selected from the Cb-component intermediate portion 312 and the Cr-component intermediate portion 313, respectively, and also arranged diagonally. In this embodiment, the minimum coded unit M32 is about 33% in size as compared with the conventional 4:4:4 sub-sampling minimum coded unit M31.

Figure 4:
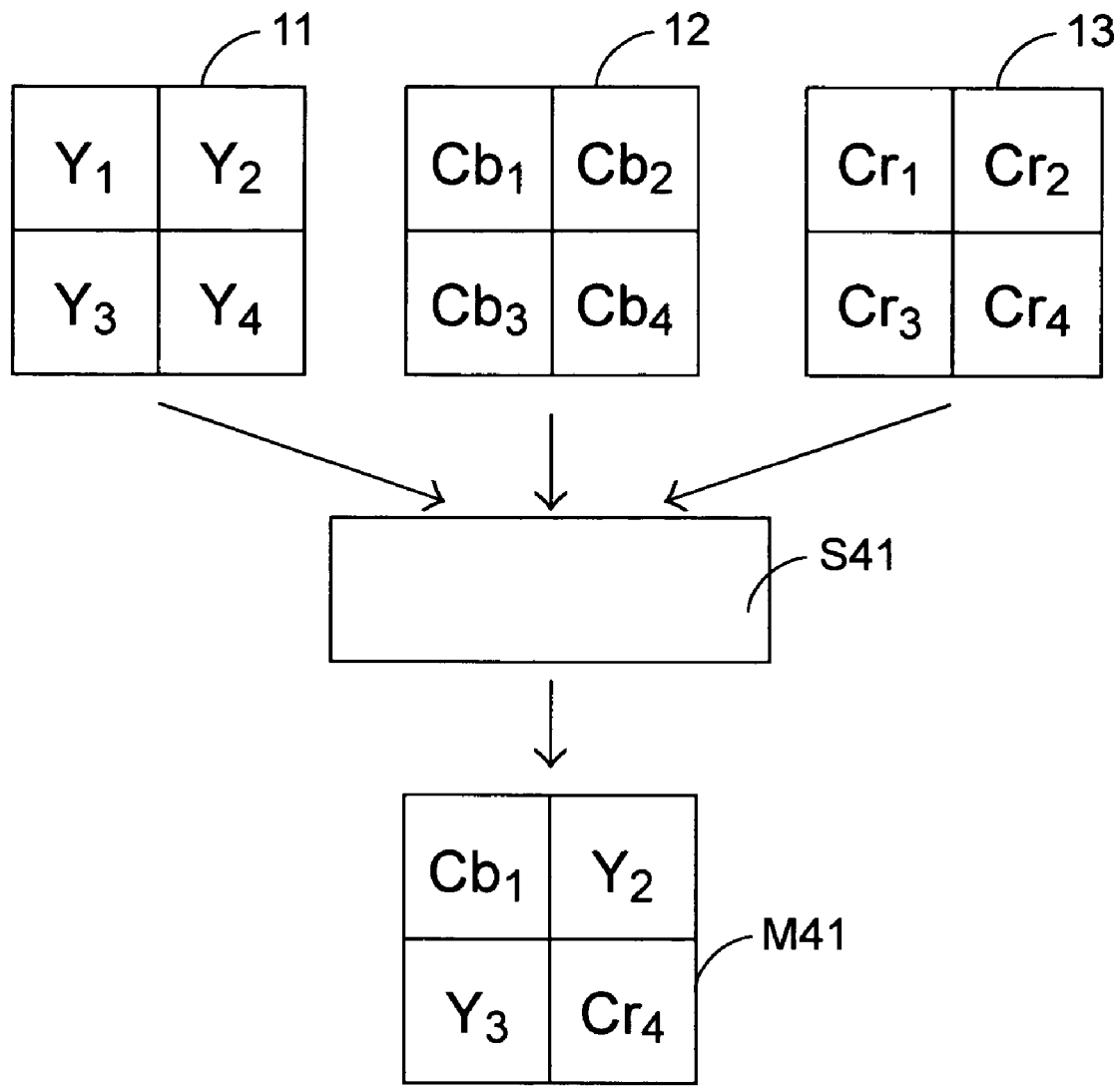
FIG. 4 is a schematic diagram illustrating an image data sampling method according to another embodiment of the present invention.

Although the additional operators S14, S24 and S34 are provided for processing the Y-component intermediate portion, the Cb-component intermediate portion and the Cr-component intermediate portion obtained from the conventional sub-sampling algorithm to result in a smaller minimum coded unit in the above embodiments, the smaller minimum coded unit, however, can be obtained by directly process the Y-component portion 11, the Cb-component portion 12 and the Cr-component portion 13. Please refer to FIG. 4 illustrates an image data sampling method according to another embodiment of the present invention. The Y-component portion 11, the Cb-component portion 12 and the Cr-component portion 13 are directly processed by the operator S41 to result in a minimum coded unit M41 consisting of four 8×8 blocks. The minimum coded unit M41 consists of four blocks $Cb_1, Y_2, Y_3$ and $Cr_4$. The two luminance blocks $Y_2$ and $Y_3$ are directly selected from the Y-component portion 11 and arranged diagonally, and the two chrominance blocks $Cb_1$ and $Cr_4$ are directly selected from the Cb-component portion 12 and the Cr-component portion 13, respectively, and also arranged diagonally.

Though the above embodiments are exemplified to be applied to JPEG compression, the present image data sampling method can be applied to other suitable fields. By this image data sampling method, a small-sized minimum coded unit is obtained. It is advantageous to simply the further processing and reduced the required memory size.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for sampling image data from an image frame, the image frame including a first component frame, a second component frame and a third component frame, and the method comprising steps of:
   selecting a first component portion, a second component portion and a third component portion from the first component frame, the second component frame and the third component frame, respectively; and
   operating said first component portion, said second component portion and said third component portion to obtain a minimum coded unit for compression, said minimum coded unit consisting of four blocks arranged as a 2×2 block array, said four blocks being substantially two first component blocks derived from said first component portion, one second component block derived from said second component portion and one third component block derived from said third component portion, said two first component blocks being positioned diagonally in one way of the 2×2 block array, and said second component block and said third component block being positioned diagonally in the other way of the 2×2 block array;
   wherein the first component frame, the second component frame and the third component frame are a luminance frame Y, a red-chrominance frame Cr and a blue-chrominance frame Cb, respectively.

2. The method according to claim 1 wherein said first component portion, said second component portion and said third component portion correspond to the same pixels of the image frame.

3. The method according to claim 1 wherein said first component portion consists of four blocks arranged as a 2×2 array, and said two first component blocks are identical to two of said four blocks of said first component portion.

4. The method according to claim 1 wherein said second component portion consists of four blocks arranged as a 2×2 array, and said one second component block is identical to one of said four blocks of said second component portion.

5. The method according to claim 1 wherein said second component portion consists of four blocks equal in size, and said one second component block is equal to any of said four blocks of said second component portion in size and has each pixel value thereof equal to an average of pixel values of said four blocks of said second component portion.

6. The method according to claim 1 wherein said third component portion consists of four blocks arranged as a 2×2 array, and said one third component block is identical to one of said four blocks of said third component portion.

7. The method according to claim 1 wherein said third component portion consists of four blocks equal in size, and said one third component block is equal to any of said four blocks of said third component portion in size and has each pixel value thereof obtained by averaging pixel values of said third component portion in a specified manner.

8. The method according to claim 1 wherein said first, second and third component portions all have a size of 16×16 pixels, and the first, second and third component blocks all have a size of 8×8 pixels.

9. The method according to claim 1 wherein said operating step comprises a first operating sub-step of operating said first component portion, said second component portion and said third component portion to result in a first component intermediate portion, a second component intermediate portion and a third component intermediate portion, and a second operating sub-step of operating said first component intermediate portion, said second component intermediate portion and said third component intermediate portion to obtain said sampled unit.

10. The method according to claim 9 wherein said first operating sub-step is a sub-sampling operation of a JPEG or MPEG compression procedure.

11. The method according to claim 10 wherein said sub-sampling operation of the JPEG compression procedure is selected from a group consisting of 4:4:4, 4:2:2, 4:2:0, 4:1:1 and 2:1:1 sub-sampling operations.

12. The method according to claim 1 wherein the first component block, the second component block and the third component block are a luminance block, a red-chrominance block and a blue-chrominance block, respectively.

13. A method for sampling image data from an image frame, the image frame including a first component frame, a second component frame and a third component frame, and the method comprising steps of:
   selecting a first component portion, a second component portion and a third component portion from the first component frame, the second component frame and the third component frame, respectively; and operating said first component portion, said second component portion and said third component portion to result in a first component intermediate portion derived from said first component portion, a second component intermediate portion derived from said second component portion and a third component intermediate portion derived from said third component portion; and operating said first component intermediate portion, said second component intermediate portion and said third component intermediate portion to obtain a minimum coded unit for compression, said minimum coded unit consisting of two first component blocks derived from said first component intermediate portion, one second component block derived from said second component intermediate portion and one third component block derived from said third component intermediate portion, which are arranged as a 2×2 block array with said two first component blocks allocated diagonally in one way of the 2×2 block array, and said second component block and said third component block being positioned diagonally in the other way of the 2×2 block array;

wherein the first component block, the second component block and the third component block are a luminance block, a red-chrominance block and a blue-chrominance block, respectively.

14. The method according to claim 13 wherein said first component portion, said second component portion and said third component portion are operated according to a sub-sampling operation of a JPEG or MPEG compression procedure.

15. The method according to claim 13 wherein said two first component blocks are identical to parts of said first component intermediate portion, said one second component block is identical to a part of said second component intermediate portion, and said one third component block is identical to a part of said third component intermediate portion.

16. A method for sampling image data from an image frame, the image frame including a Y-component frame, a Cr-component frame and a Cb-component frame, and the method comprising steps of:

selecting a Y-component portion, a Cr-component portion and a Cb-component portion from the Y-component frame, the Cr-component frame and the Cb-component frame, respectively; and operating said Y-component portion, said Cr-component portion and said Cb-component portion according to a sub-sampling algorithm for JPEG or MPEG compression to result in a Y-component intermediate portion, a Cr-component intermediate portion and a Cb-component intermediate portion; and operating said Y-component intermediate portion, said Cr-component intermediate portion and said Cb-component intermediate portion to obtain a minimum coded unit of 2×2 block array for JPEG or MPEG compression, wherein said 2×2 block array consists of two Y-component blocks selected from said Y-component intermediate portion, one Cr-component block selected from said Cr-component intermediate portion, and one Cb-component block selected from said Cb-component intermediate portion; said two Y-component blocks being positioned diagonally in one way of the 2×2 block array, and said Cr-component block and said Cb-component being positioned diagonally in the other way of the 2×2 block array.

17. The method according to claim 16 wherein the Y-component block, the Cb-component block and the Cr-component block are a luminance block, a red-chrominance block and a blue-chrominance block, respectively.

* * * * *